United States Patent [19]
Cadou et al.

[11] Patent Number: 5,747,747
[45] Date of Patent: May 5, 1998

[54] CONTINUING BELT-TYPE CONVEYOR AND MEANS FOR WEIGHING CONTENTS TRANSPORTED THEREON

[75] Inventors: Peter B. Cadou, Chagrin Falls; John C. Homer, III, Newbury; Kevin A. Alexeff, Seven Hills, all of Ohio

[73] Assignee: General Signal Corporation, Stamford, Conn.

[21] Appl. No.: 590,154

[22] Filed: Jan. 23, 1996

[51] Int. Cl.⁶ .......................... G01G 19/00; G01G 21/10
[52] U.S. Cl. .......................... 177/145; 177/184; 177/187
[58] Field of Search .......................... 177/119, 145, 177/147, 16, 151, 152, 168, 170, 175, 187, 188, 189

[56] References Cited

U.S. PATENT DOCUMENTS

| | | | |
|---|---|---|---|
| 2,301,177 | 11/1942 | Hadley | 177/16 |
| 2,533,710 | 12/1950 | Biehler | 177/16 |
| 2,882,036 | 4/1959 | Lyons | 177/16 |
| 3,209,846 | 10/1965 | Karlen | 177/16 |
| 3,390,731 | 7/1968 | Schierbeek | 177/16 |
| 3,478,830 | 11/1969 | Levesque et al. | 177/16 |
| 3,578,955 | 5/1971 | Koven | 177/16 |
| 3,718,197 | 2/1973 | Barten et al. | 177/16 |
| 3,924,729 | 12/1975 | Flinth et al. | 177/16 |
| 4,102,295 | 7/1978 | Crook, Jr. et al. | 177/147 |
| 4,134,465 | 1/1979 | Takahama et al. | 177/16 |
| 4,418,773 | 12/1983 | Finet et al. | 177/16 |
| 4,463,816 | 8/1984 | MacFarlane | 177/119 |
| 4,764,102 | 8/1988 | Takahashi | 177/16 |
| 5,111,896 | 5/1992 | Porcari et al. | 177/16 |
| 5,166,484 | 11/1992 | Young et al. | 177/16 |
| 5,296,654 | 3/1994 | Farley et al. | 177/119 |

*Primary Examiner*—Michael L. Gellner
*Assistant Examiner*—Randy W. Gibson
*Attorney, Agent, or Firm*—Ohlandt, Greeley, Ruggiero & Perle

[57] ABSTRACT

There is provided a conveyor system having a conveyor belt for continuously transporting materials from a feed hopper to an end feed mechanism and a means for continuously weighing the bulk material as they pass over the weigh span of the conveyor belt. The conveyor system comprises a continuous conveyor belt disposed about a pair of pulleys for transporting a material from a feed hopper to a feed mechanism, at least one pair of support rollers, and a weigh assembly having a weigh roller means for continuously determining the weight of materials within the weigh span of the conveyor belt. The support rollers are positioned under the upper portion of the conveyor belt and spaced apart to define the boundaries of the weigh span. Moreover, the support rollers are disposed on opposite sides of the weigh roller wherein the pitch between each support roller and the weigh roller are identical and wherein the support rollers and the weigh roller are on the same horizontal plane.

42 Claims, 8 Drawing Sheets

CONTINUING BELT-TYPE CONVEYOR AND MEANS FOR WEIGHING CONTENTS TRANSPORTED THEREON

The present invention relates generally to continuing or endless belt-type conveyor systems for transporting bulk material having gravimetric-type weighing means for continuously weighing the bulk material as they pass over a particular weigh span of the conveyor belt. More particularly, the present invention relates to a conveyor system having a weigh assembly which is capable of accurately and continuously determining the weight of materials disposed within the weigh span of the conveyor belt at any given time. The weigh assembly comprises unique micrometer adjusters which are capable of adjusting the vertical and horizontal position of the weight roller of the weigh assembly, a flexure assembly which replaces the conventional sleeve bearing and a point contact type pivot configuration which replace conventional ball joints, thereby eliminating measurement errors caused by dirt and corrosion about the weigh assembly.

BACKGROUND OF THE INVENTION

Continuous conveyor systems for transporting bulk material (e.g., crushed coal) from a feed hopper to a receiving bin or metal ore furnace are known in the art. Generally, such conveyor systems include a conveyor belt that rotates about a pair of oppositely disposed pulleys. Typically, the conveyor system includes a weigh assembly for continuous gravimetric or material weighing of the bulk material as it passes over a predefined weigh span of the conveyor belt. In particular, an upper strand of the belt may be supported by numerous support rollers that are spaced apart a predetermined amount. It is the spacing between any three support rollers that defines the length of the weigh span. As the bulk material passes over the weigh span, a microprocessor connected to the weigh assembly and belt drive (motor) determines the feed rate, i.e., net weight per unit of time, of the bulk material carried by the conveyor belt. Thus, by monitoring the feed rate, the speed of the conveyor system may be controlled to conform with the momentary bulk material delivery requirements.

One type of weigh assembly known in the art includes a weigh roller for continuously determining the weight of bulk material within the weigh span of the conveyor belt. The weigh roller is supported between two support rollers by a piezoelectric type or strain gauge type load cell transducer that produces an electric signal corresponding to the gross weight of the bulk material and the tare weight presently disposed within the weigh span. For example, U.S. Pat. No. 4,418,773 to A. Finet, et al. entitled CONVEYOR CALIBRATION TECHNIQUE, provides an endless belt-type conveyor for transporting bulk material that produces a variable frequency signal indicative of its feed rate. A weigh roller is typically positioned at a midpoint between a pair of span rollers and is supported by a load cell based element that provides an analog signal indicating the gross weight of the bulk material. A microprocessor electrically connected to the load cell subtracts the tare weight (i.e., the weight of the weigh roller, the belt section across the weigh span, and the other belt support elements) from the gross weight registered by the load cell to determine the net weight of the bulk material. The net weight is then multiplied by the belt speed, determined by a tachometer, to determine the feed rate of the bulk material in terms of the net weight per unit of time.

However, conventional conveyor systems, including the above described system of U.S. Pat. No. 4,418,773, fail to provide consistent indications of the bulk material feed rate that are within certain accuracy requirements, such as the generally preferred requirement of better than ±0.5% accuracy throughout the life of the system. Although some conventional conveyor systems may be able to achieve such accuracy upon calibration, they are not able to hold that level of accuracy after the system is in operation for an extended period of time.

One reason for such failure is the inability of conventional conveyor systems to facilitate optimum system set-up geometry. Specifically, conventional conveyor systems have weigh assemblies that can only be adjusted vertically by means of a crude threaded ball joint and locknut arrangement which is disposed between a load cell and a weigh roller. Thus, there is no facility for relocating the weigh roller horizontally.

Another reason is the undesired changes in the system geometry due to physical loading variations. In particular, the weigh assembly of conventional conveyor systems include a swivel type connection that is prone to cause misalignments that induce extraneous forces that are erroneously detected by the load cells as the load changes.

Since feeder environments are generally subject to foreign matter, such as floating dust particles of the bulk material, harmful exposure to the foreign matter is likely to cause the weigh assembly to incorrectly measure the bulk material within the weigh span. That is, the problematic measurement variations are believed to be caused by corrosion, wear or congestion due to contamination by foreign matters (e.g., coal dust, coal slurries and products of corrosion) at mechanical joints of conventional weigh assemblies. When mechanical joints begin to corrode, wear or corrupt they may be prevented from moving freely which also causes erroneous load changes to be registered by the load cells. As described above, it is desirable to have a highly accurate weigh assembly, preferably better than ±0.5% accuracy, and thus the slightest hindrance to adjustments by the mechanical joints of the weigh assembly is very detrimental to weighing accuracy.

Also, weigh assemblies typically have drag links or other means that supports one side of the housing of the weigh roller to prevent the weigh roller from shifting horizontally during operation. For conventional weigh assemblies, grease may be injected into the bearing housing by way of the drag link or through the bearing cover in order to flush dirt, bulk material and other foreign matter lodged about the ball bearings of the weigh roller. However, the flow of grease through the drag link, variations in grease viscosity and pressure induce this flexible drag link to cause horizontal movement or misalignment of the weigh roller, thereby also affecting the accuracy of the weigh assembly by erroneously registering with the load cells as load changes.

Accordingly, the present invention is a continuous conveyor system having a weigh assembly that suspends a weigh roller disposed equidistantly between two support rollers such that all three rollers are on the same horizontal plane. This unique weigh assembly is capable of accurately determining the weight of bulk material passing over a weigh span of the conveyor belt in order to continuously provide a feed rate indication of the bulk material that is better than ±0.5% accuracy. The weigh assembly according to the present invention is also capable of providing micrometer adjustment to the horizontal and vertical position of the weigh roller to avoid load changes associated with positional irregularities of the weigh assembly. Furthermore, the replacement of the ball joints and swivel joint in the weigh assembly of the present invention with high pressure contact pivots and flexure assemblies substantially minimizes the likelihood that corrosion, wear or congestion due to contamination from entrained particles will substantially effect accuracy due to the concentrated load distribution afforded by the high pressure contact pivot and the flexure assembly design.

SUMMARY OF THE INVENTION

The present invention is a conveyor system for transporting bulk material from a feed hopper to a receiving bin or metal or ore furnace and for continuously weighing the bulk material transported by the conveyor system which, in brief summary, comprises a continuous conveyor belt disposed about a pair of pulleys, the conveyor belt having an upper strand and a lower strand moving in opposite directions, at least one pair of support rollers positioned under the upper strand and spaced apart to defined boundaries of a weigh span portion of the conveyor belt, and a weigh assembly having a weigh roller which is disposed equidistant from each of the support rollers such that the weigh roller, and the first and second support rollers are in planar alignment with one another.

A weigh assembly comprising: a weigh roller having first and second ends; a first means for controlling the vertical position of the first end of the weigh roller; a first means for controlling the horizontal position of the first end of the weigh roller; a first spring means for compensating for variations in the load passing over the weigh roller; a first point contact type pivot assembly disposed between one end of the second spring means and the first means for controlling the vertical position of the first end of the weigh roller; a first load cell capable of weighing the load passing over the weigh roller, the load cell being connected to the other end of the first spring means which is opposite to the first means for controlling the vertical position of the first end of the weigh roller; a second point contact type pivot affixed to the first load cell opposite the first spring means; a second means for controlling the vertical position of the second end of the weigh roller; a second means for controlling the horizontal position of the second end of the weigh roller; a second spring means for compensating for variations in the load passing over the weigh roller; a third point contact type pivot assembly disposed between one end of the second spring means and the second means for controlling the vertical position of the second end of the weigh roller; a second load cell capable of weighing the load passing over the weigh roller, the load cell being connected to the other end of the second spring means which is opposite to the second means for controlling the vertical position of the second end of the weigh roller; and a fourth point contact type pivot affixed to the second load cell opposite the second spring means.

The weigh assembly also includes first and second bearing assemblies having the weigh roller rotably disposed therebetween. The first and second bearing assemblies each have a bearing housing containing a bearing having an inner race and an outer race capable of permanently sealing lubricated ball bearings therebetween. Also, the first and second bearing assemblies are each connected to its respective means for controlling the vertical position of the weigh roller which is opposite the first point contact type pivot assembly. They are also connected to a respective end of the means for controlling the horizontal position of the weigh roller.

The means for controlling the vertical and horizontal position of the weigh roller are preferably a pair of micrometer adjusters. Each micrometer adjuster comprises a threaded pin having a first pitch of threads on one side of the threaded pin, a second pitch of threads on the other side of the threaded pin that is different from the first pitch of threads, and an adjusting knurl disposed between the first pitch of threads and the second pitch of threads which is capable of simultaneously rotating the first pitch of threads and second pitch of threads of the threaded pin, thereby allowing for either the vertical or horizontal adjustment of the weigh roller.

In addition, the weigh assembly includes an adjuster block and locking pin for securing its respective micrometer adjuster used to control the vertical position of the weigh roller at a particular locked vertical position and another adjuster block and locking pin for securing the micrometer adjuster used to control the horizontal position of the weigh roller at a particular locked horizontal position. Preferably, the first pitch of threads and the second pitch of threads of the threaded pin are threaded in the same direction, and more preferably, the first pitch of threads is preferably about 16 pitch and the second pitch of threads is preferably about 20 pitch. For the preferred embodiment, the first pitch of threads is about 16 pitch, and right threaded and the second pitch of threads is about 20 pitch and also right threaded.

The weigh assembly further includes at least one stop pin disposed about the lower end of each spring means such that it is adjacent to the micrometer adjuster used to control the vertical position of the weigh roller. The stop pin or pins transfer the weight of the load away from the load cell when the load increases beyond a particular threshold weight, such as about 80 lbs., thereby protecting the load cell from undesired stresses.

The first point contact type pivot assembly is disposed between one end of the spring means and the means for controlling the vertical position of the weigh roller, and a second point contact type pivot is affixed to the load cell opposite the spring means. The first point contact type pivot assembly and the second point contact type pivot assembly each include a pivot pin having an outer circumferential surface and a pivot ring having an inner circumferential surface wherein a particular high pressure contact point of the inner circumferential surface of the pivot ring contacts a respective high pressure contact point of the outer circumferential surface of the pivot pin. The pivot pin is perpendicularly disposed within the inner circumferential surface of the pivot ring. The diameter of the inner circumferential surface of the pivot ring is substantially larger than the diameter of the outer circumferential surface of the pivot pin so that the pivot pin has a large degree of vertical movement within the pivot ring, thereby providing additional protection to the load cell should the weigh roller be accidentally moved upward out of its normal operational position.

The weigh assembly still further includes a pair of drag links coupled to respective ends of the micrometer adjusters used to control the horizontal position of the weigh roller, and a pair of flexure assemblies disposed about the end of the respective drag link which is opposite the respective micrometer adjuster. The flexure assembly includes a flexure having a shaft and a plate portion, a pivot fastener disposed about the shaft to provide support thereof during pivotal adjustment, a set screw extending through an end portion of the pivot fastener for securing the pivot fastener about the shaft, and a flexure bracket coupled to the plate portion that is coupled to an end of the drag link.

The outer surface of each roller, namely the weigh roller and the support rollers, may be a special alloy or include a surface treatment, preferably a fluorocarbon resin coating (i.e., Teflon®), for preventing adhesion of foreign matters to the outer surface, thereby preventing an increase in the cross-sectional diameter of the weigh roller due to accumulation of such foreign matters on the weigh roller which would alter the geometry of the weigh plane and, thereby, the accuracy of the weigh system.

DETAILED DESCRIPTION OF THE PREFERRED EMBODIMENT

The present invention is directed to a continuous conveyor system having a weigh assembly that provides a continuous and accurate analog of the weight of bulk material passing over the weigh span of the conveyor belt in such a way as to determine a bulk material feed rate that is highly accurate. This unique weigh assembly can be adjusted horizontally and is arranged efficiently so that the system is capable of facilitating optimum system set-up geometry. Moreover, the weigh assembly is not prone to misalignments which are erroneously detected by the load cell as load changes and is not, therefore, subject to these load changes. As such, the accuracy of the weigh assembly is not effected, or minimally effected, by problematic variations at mechanical joints of the system due to corrosion, wear or congestion. This unique weigh assembly which is preferably disposed within a continuous belt-type conveyor provides a feed rate indication of the bulk material having very high accuracy.

Figure 1:
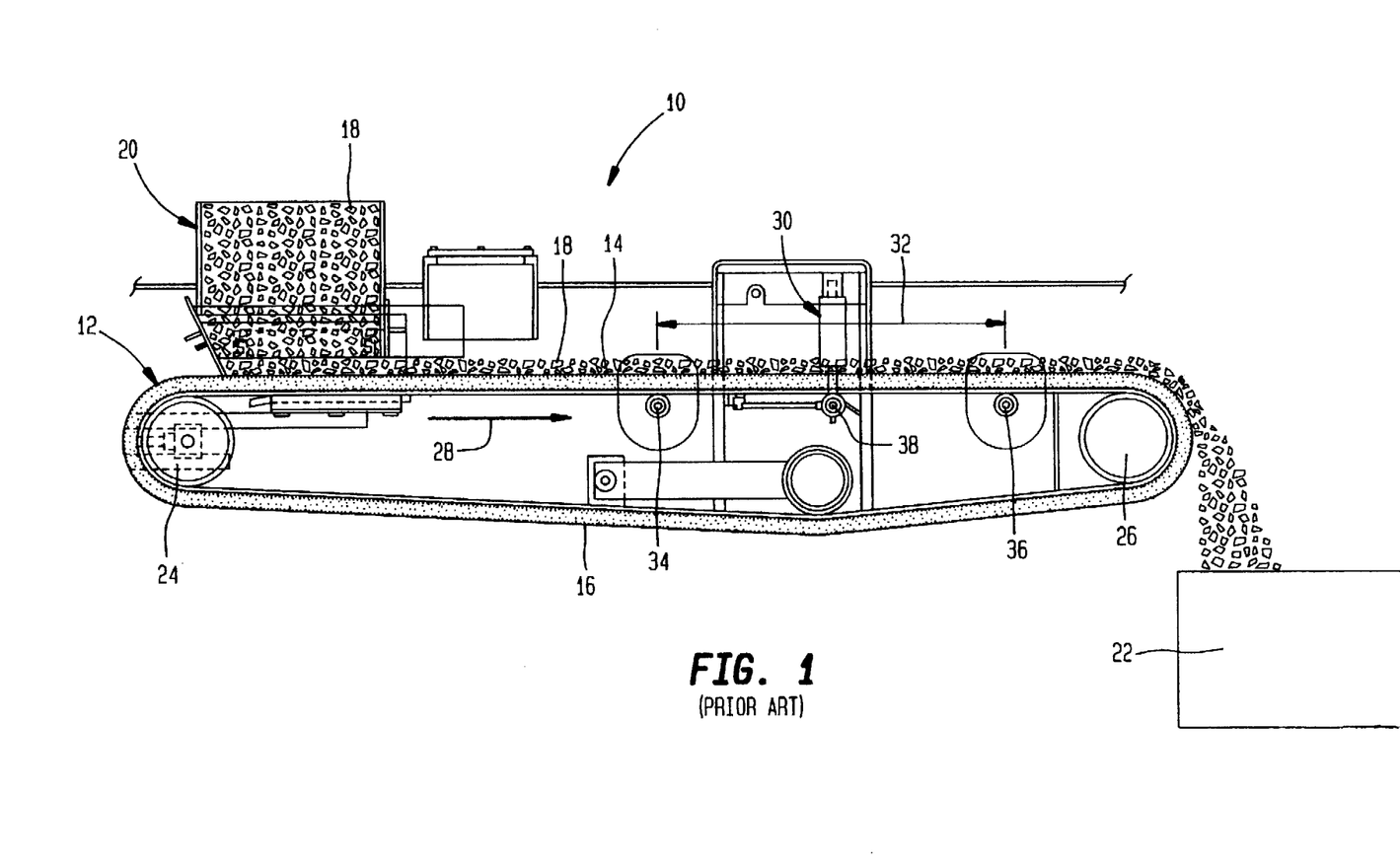
FIG. 1 is a side sectional view of a conventional continuous conveyor system.
Figure 2:
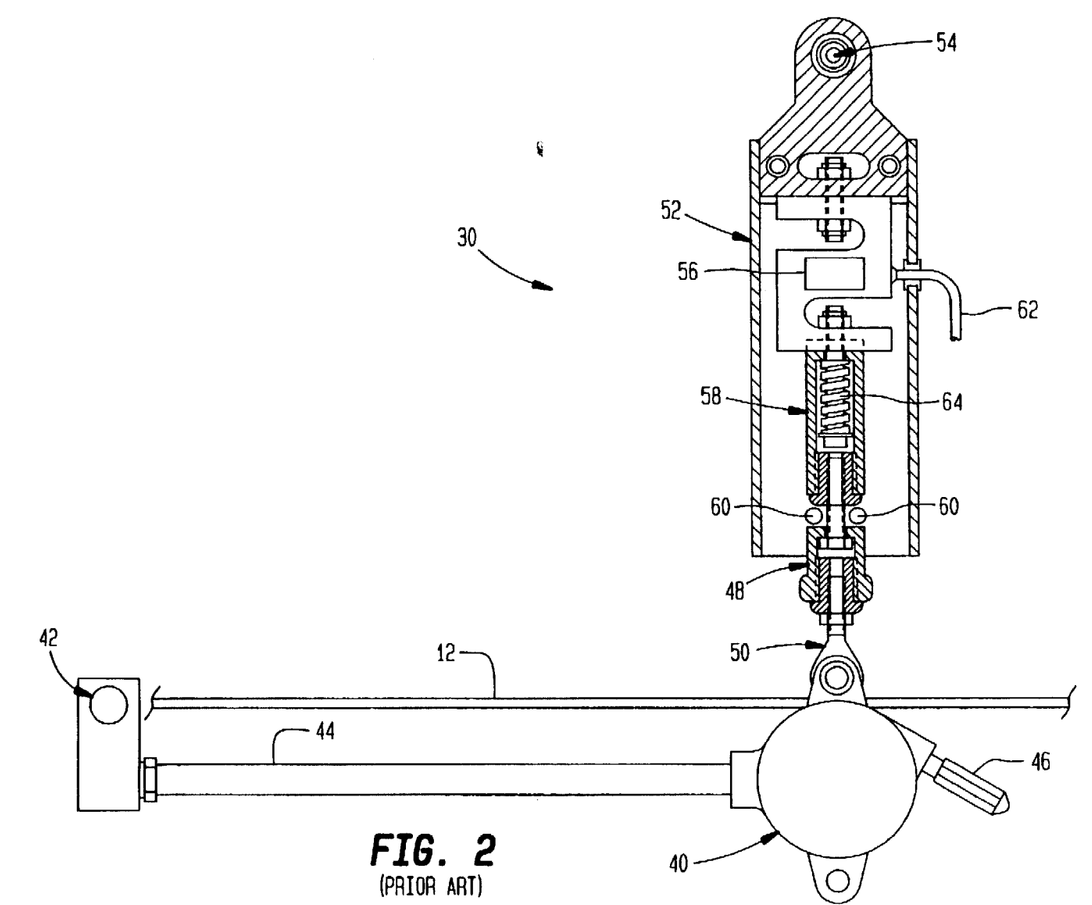
FIG. 2 is cross-sectional view of a conventional weigh assembly with the bearing housing and drag link shown as a side perspective view which is depicted in FIG. 1.

Referring to the drawings, FIGS. 1 and 2 represent a conventional continuous/endless conveyor system and a weigh assembly, respectively, and FIGS. 3 through 7 represent a weigh assembly of the preferred embodiment. Although the conventional conveyor system of FIG. 1 includes the conventional weigh assembly of FIG. 2, the weigh assembly of the present invention may be used in the conventional conveyor system of FIG. 1 or any conveyor of similar design; provided that the support rollers are disposed equidistant from the weigh roller and provided that all such rollers are on the same horizontal plane. Therefore, throughout the present application, unless otherwise noted, it is to be understood that any reference to a continuous belt-type conveyor system of the present invention shall be represented by the conveyor system of FIG. 1 in which the conventional weigh assembly, shown in FIG. 2, is replaced by the weigh assembly of the preferred embodiment, shown in FIGS. 3 through 7.

Referring to FIG. 1, in particular, there is provided a conventional continuous or endless conveyor system of the prior art which is generally represented by reference numeral 10. Conveyor system 10 comprises a continuous conveyor belt 12 in the form of a loop having a upper strand or portion 14 and a lower strand or portion 16 for continuously transporting bulk material 18 (e.g., crushed coal) from a feed hopper 20 to a receiver (e.g., feed bin or furnace) 22. Conveyor belt 12 is disposed about a pair of pulleys (24, 26) that drive conveyor belt 12 in a clockwise direction 28, as viewed from the perspective of FIG. 1. Bulk material 18 is preferably evenly distributed onto conveyor belt 12 at one end of upper portion 14 and transported to the other end of upper portion 14 where it falls into receiver 22. As bulk material 18 is transported across upper portion 14 of conveyor belt 12, it passes through a weigh assembly 30.

Conventional weigh assembly 30, similar to the weigh assembly of the preferred embodiment described below, continuously weighs bulk material 18 as it passes over a weigh span 32 of conveyor belt 12. The boundaries of weigh span 32 are defined by the position of two support rollers (34, 36) disposed under upper portion 14 of conveyor belt 12. Accordingly, the distance separating support rollers (34, 36) corresponds to the length of weigh span 32. Also, weigh assembly 30 includes a weigh roller 38 for continuously determining the weight of bulk material 18 within weigh span 32 of conveyor belt 12. In accordance with the preferred embodiment of the present invention, support rollers (34, 36) are disposed on opposite sides of weigh roller 38 in which the pitch between each support roller (34, 36) and weigh roller 38 are identical such that weigh roller 38 is centered between support rollers (34, 36). In addition, when bulk material 18 is being weighed support rollers (34, 36) and weigh roller 38 are in the same, or substantially the same, horizontal plane.

FIG. 2 depicts conventional weigh assembly 30 shown in FIG. 1. The ends of weigh roller 38 (shown in FIG. 1) of weigh assembly 30 are supported by a pair of bearing assemblies 40, one of which is shown in FIG. 2. Bearing assembly 40 permits weight roller 38 to rotate thereabout. In order to flush foreign matter and contaminants from the ball bearings disposed within bearing assembly 40, grease is injected through drag link 44 via a threaded extension through sleeve bearing 42 to which a grease hose (not shown) is attached. After flowing through the ball bearings, the grease exits bearing assembly 40 through a grease relief valve 46. The flow of grease through the grease hose creates a moment that has a tendency to compromise the stability of weigh roller 38.

Conventional weigh assembly 30 can only be easily adjusted vertically. In particular, a vertical adjustment is accomplished by a threaded swivel and locknut arrangement 48 at the lower portion of weigh assembly 30. Also, the connection between threaded swivel and locknut arrangement 48 and bearing assembly 40 is made through a swivel assembly 50 that is prone to cause misalignments. In addition, housing 52 of prior art weigh assembly 30 does not protectively enclose threaded swivel and locknut arrangement 48 and swivel assembly 50 from the feeder environment. Similarly, a ball joint 54 at an upper portion of weigh assembly 20 is also exposed to the feeder environment.

Within housing 52, weigh assembly 30 includes a load cell 56 hanging from ball joint 54, a spring biased overload mechanism 58 connected to a lower end of load cell 56, and a pair of stop pins 60 disposed about a lower end of overload mechanism 58. Load cell 56 is a precision strain gauge load cell having a static structure, i.e. no moving parts, that is waterproof and barometrically insensitive. Also, load cell 56 provides a gross weight signal via a output line 62 generally in the form of an analog voltage. Overload mechanism 58 includes a spring element 64 that limits the deflection of weigh assembly 30 as the weight subjected to weigh roller 38 (shown in FIG. 1) is increased. Analogously, stop pins 60 prevents weigh assembly 30 from deflecting further when a particular threshold weight subjected to weigh roller 38 has been reached, such as 80 lbs.

Figure 3:
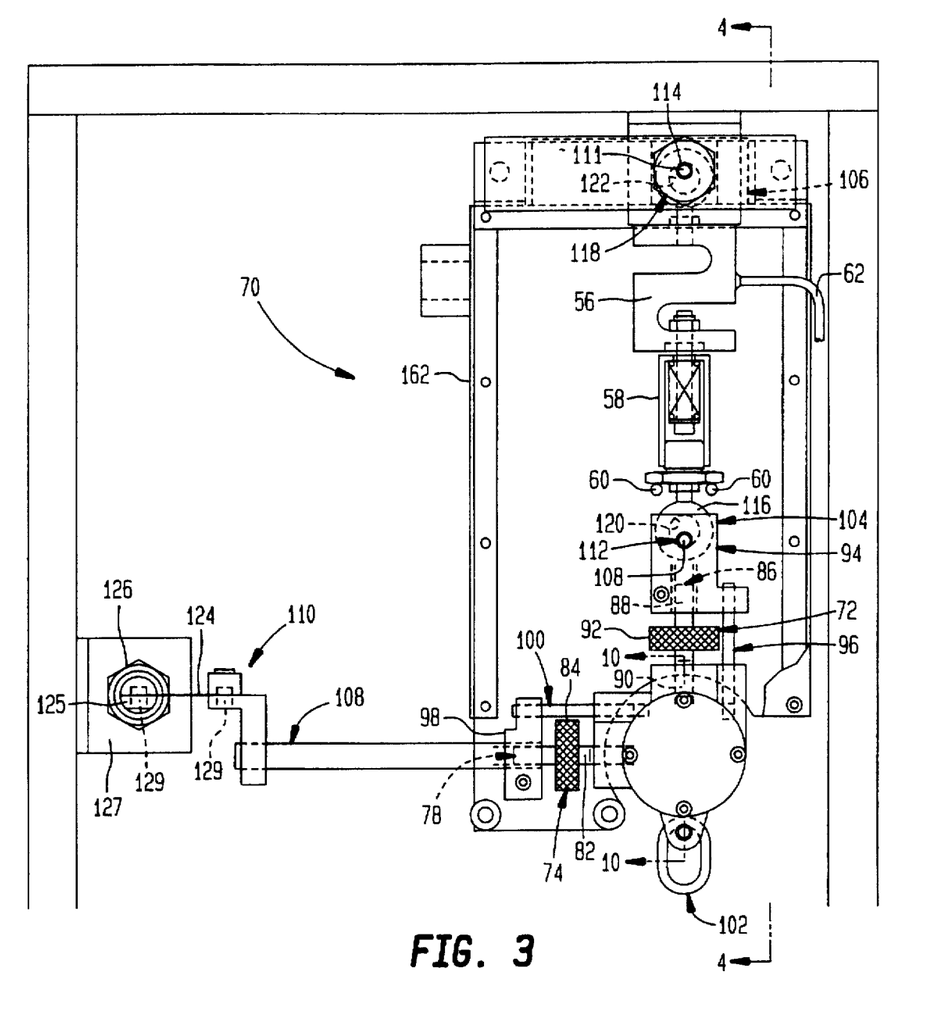
FIG. 3 is a side partial cross-sectional view of the preferred embodiment of the weigh assembly of the present invention.

Referring to the remainder of the drawings (namely, FIGS. 3 through 7) and, in particular, to FIG. 3, there is provided a weigh assembly of the preferred embodiment which is generally represented by reference numeral 70. Although several of the components of preferred weigh assembly 70 are similar to corresponding components of the prior art weigh assembly of FIG. 2, such as load cell 56, overload mechanism 58, stop pins 60 and output line 62, preferred weigh assembly 70 is quite distinct in many ways. In particular, preferred weigh assembly 70 includes means for controlling the vertical position of the weigh roller and means for controlling the horizontal position of the weigh roller that provide the capability of setting up the optimum geometric position of the weigh roller relative to the support rollers. In addition, preferred weigh assembly 70 includes a three linkage joint arrangement, specifically two point contact type pivot assemblies (i.e., a pivot ring and a pivot pin combination) and a combination of a drag link and a flexure assembly, to minimize sensitivity to corrosion, congestion and wear. Other components and features of the present invention will be more apparent from the following detailed explanation of the preferred embodiment.

Figure 4:
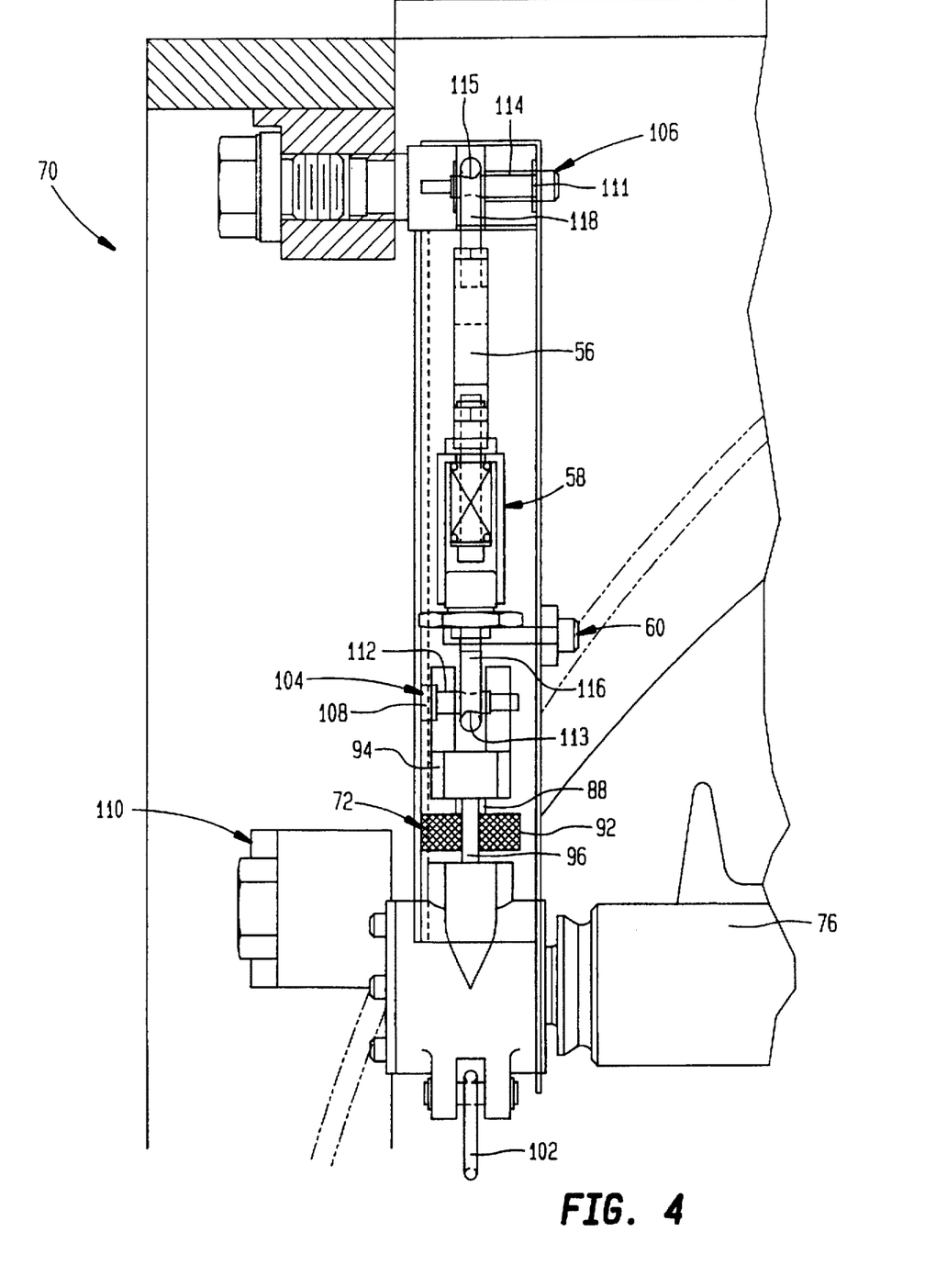
FIG. 4 is a partial cross-sectional view along line 4—4 of FIG. 3.

Referring specifically to FIGS. 3 and 4, the preferred embodiment includes a weigh assembly 70 for supporting weigh roller 76 at either end. Each preferred weigh assembly 70 includes two differential pitch micrometer adjusters (72, 74) that facilitate optimal vertical and horizontal placement, respectively, of weigh roller 76 (represented in FIG. 1 by reference numeral 38) relative to support rollers (34, 36) shown in FIG. 1. Vertical micrometer adjuster 72 and horizontal micrometer adjuster 74 each have a threaded pin (78, 86) with a first pitch of threads (80, 88) on one side and a second pitch of threads (82, 90) that is different from the first pitch of threads on the other side. For example, first pitch of threads (80, 88) may be about 16 pitch, and second pitch of threads (82, 90) may be about 20 pitch. Each threaded pin (78, 86) also includes an adjusting knurl (84, 92) located between first pitch of threads (80, 88) and second pitch of threads (82, 90) that may be rotated to turn the threaded pin. Thus, vertical micrometer adjuster 72 allows for vertical adjustment of weigh roller 76, and horizontal micrometer adjuster 74 allows of horizontal adjustment of weigh roller 76. Preferably, first pitch of threads (80, 88) and second pitch of threads (82, 90) of each threaded pin 78 have different pitches, as stated above, and are threaded in a same direction, such as right threaded, to provide for high precision adjustment in the vertical or horizontal direction.

Accordingly, the above arrangement of the present invention has an adjustment sensitivity (t1) that is more favorable and advantageous over the adjustment sensitivity (t2) of a conventional arrangement of having the same pitch but opposite hand threads as follows:

$$t1 = (1/p1) - (1/p2) = (p2 - p1)/(p1 * p2), \text{ and}$$
$$t2 = (1/p1) + (1/p1) = 2/p1$$

If $p1 - p2 = -\delta$ is small,
then $(t2/t1) = (2 * p1)/\delta$

Thus, for the above example in which first pitch of threads (80, 88) is about 16 pitch and second pitch of threads (82, 90) is about 20 pitch, the improvement in adjustment sensitivity becomes 8 to 1.

Preferred weigh assembly 70 also includes guide pins 96 and 100 which act to avoid rotation of adjuster block 94 and 98. Adjuster block 94 also includes locking screw 95 which secures vertical micrometer adjuster 72 at a particular vertically locked position, and a horizontal adjuster block 98 includes locking screw 100 which secures horizontal micrometer adjuster 74 at a particular horizontally locked position. Thus, once vertical micrometer adjuster 72 is used to adjust the vertical position of weigh roller 76, vertical adjuster block 94 and vertical locking screw 95 secure weigh roller 76 at that particular vertically locked position, and horizontal adjuster block 98 and the horizontal locking screw 100 operate similarly.

A calibration ring 102 is disposed at the lower end of preferred weigh assembly 70. By supporting a desired calibration weight at calibration ring 102 and adjusting the position of weigh roller 76 is that it is disposed equidistant from and in planar alignment with each of support rollers (34, 36), the position of weigh roller 76 may be calibrated for optimal performance of weigh assembly 70.

Figure 5:
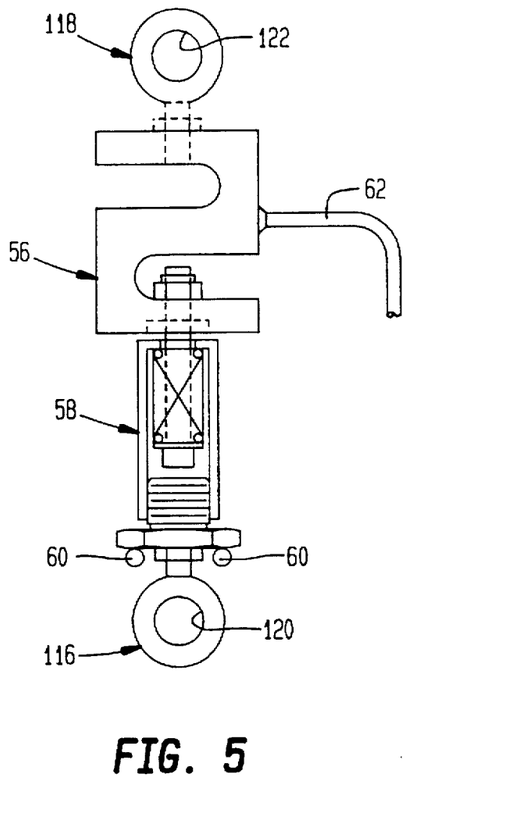
FIG. 5 is a partial cross-sectional view of the components of the weigh assembly of FIG. 3 extending between the two pivot rings of the point contact type pivot assemblies.

Referring to FIG. 5, in conjunction with FIGS. 3 and 4, preferred weigh assembly 70 includes a three linkage joint arrangement to minimize sensitivity to corrosion, congestion and wear. Specifically, a pair of high pressure multidegree of freedom point contact type pivot assemblies (104, 106) are positioned above and below load cell 56 and overload mechanism 58, and a combination of a drag link 108 and a flexure assembly 110 extends from horizontal micrometer adjuster 74 to one side of weigh roller 76. First point contact type pivot assembly 104 is secured to the lower end of overload mechanism 58, and second point contact type pivot assembly 106 is secured to the upper end of load cell 56.

Figure 6:
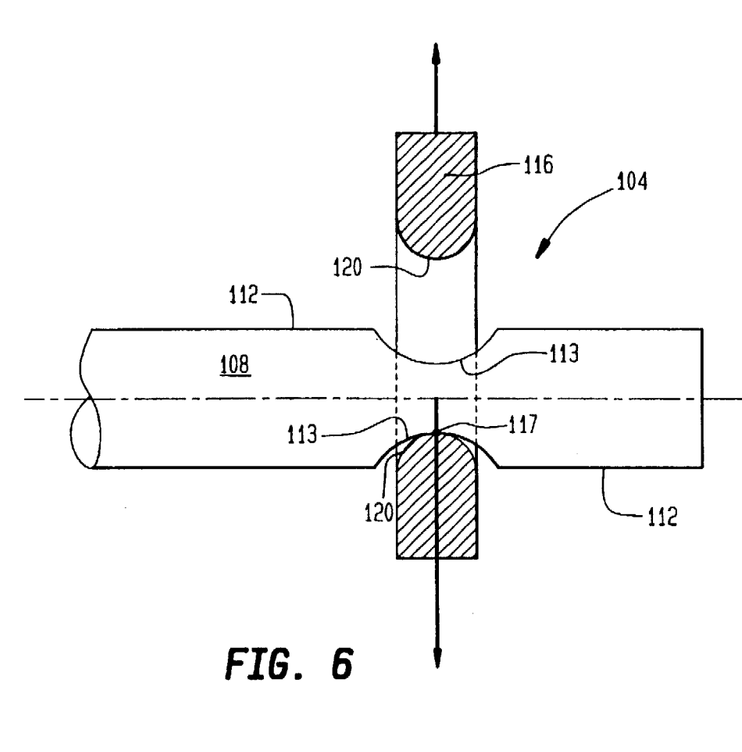
FIG. 6 is an enlarged view of the first point contact type pivot assembly of FIG. 4.

Referring to FIGS. 4 and 6, each point contact type pivot assembly (104, 106) includes a pivot pin (108, 111) having an outer circumferential surface (112, 114) and a pivot ring (116, 118) having an inner circumferential surface (120, 122). Although FIG. 6 is an enlarged view of first point contact type pivot assembly 104, this figure also represents the general structure and functions of second point contact type pivot assembly 106. Each pivot pin (108, 111) has a peripheral groove (113, 115) form ed about a portion of circumferential surface (112, 114) for supporting and retaining a particular high pressure contact point of each respective pivot ring (116, 118). By using such point contact type pivot assemblies (104, 106), a particular high pressure contact point at inner circumferential surface (120, 122) of pivot ring (116, 118) contacts the respective high pressure contact point at outer circumferential surface (112, 114) of pivot pin (108, 111), specifically at peripheral groove (113, 115). The connection of the high pressure contact points of the pivot ring 116 and the pivot pin 108 of the first point contact type pivot assembly 104 is represented as reference numeral 117 in FIG. 6. Although not shown, the pivot ring 118 and the pivot pin 111 of the second point contact type pivot assembly 106 also form such a connection. Thus, by having a single high pressure contact point connection at each point contact type pivot assembly (104, 106), each connection is provided a multidegree of freedom, and thus high precision in the positional adjustment. In addition, foreign matter or debris is fully and efficiently "contacted" away to avoid problematic variations at mechanical joints such as that which occurs with ball joints used in conventional weigh assemblies due to corrosion, congestion and wear.

As shown in FIGS. 3 and 6, the diameter of inner circumferential surface (120, 122) of each pivot ring (116, 118) is substantially larger than the diameter of outer circumferential surface (112, 114) of each pivot pin (108, 111). Thus, pivot pins (108, 111) and pivot rings (116, 118) have a multidegree of freedom of movement relative to each other. In addition, for a situation where the lower portion of weigh assembly 70 is accidentally lifted upward, the open areas in each pivot ring (116, 118) provide a large degree of room for such upward vertical motion so that load cell 56 will not be compacted between second point contact type pivot assembly 106 and overload mechanism 58, thereby causing damage thereto.

Figure 7:
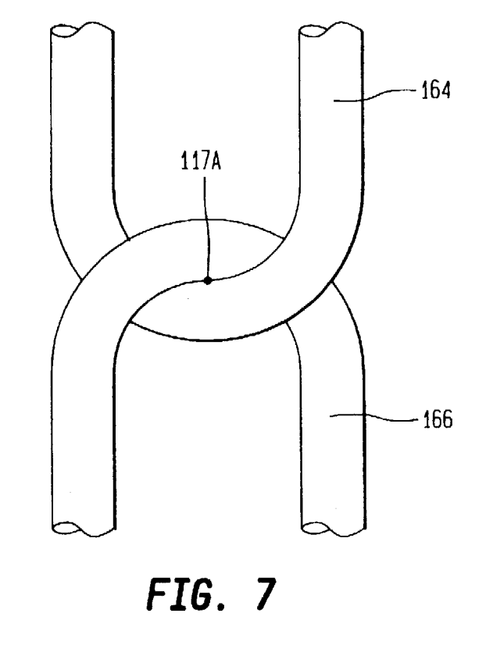
FIG. 7 is a side planar view of an alternative embodiment for each point contact type pivot assembly shown in FIG. 4.

Referring to FIG. 7, there is shown an alternative embodiment for first and second point contact type pivot assemblies (104, 106) shown in FIG. 4. In particular, two hardened chain links (164, 166) placed in tension may function similarly to the preferred point contact type pivot assemblies, (104, 106) described above. Like the preferred point contact type pivot assemblies (104, 106), the surface area in contact or connection 117A is very small, and the contact force (in psi) is very large, unlike spherical bearings of conventional weigh assemblies. Thus, foreign matter such as dirt and corrosion will not prevent first and second point contact type pivot assemblies (104, 106) of the preferred embodiment and two hardened chain links (164, 166) of the alternative embodiment from pivoting, and the high contact force at their connections (117, 117A) keep the pivot area substantially clean.

Figure 8:
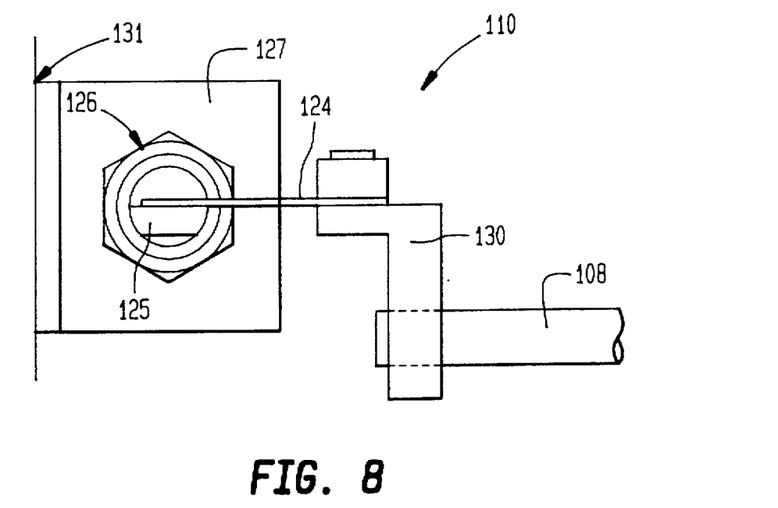
FIG. 8 is an enlarged cross-sectional view of the flexure assembly of FIG. 3.
Figure 9:
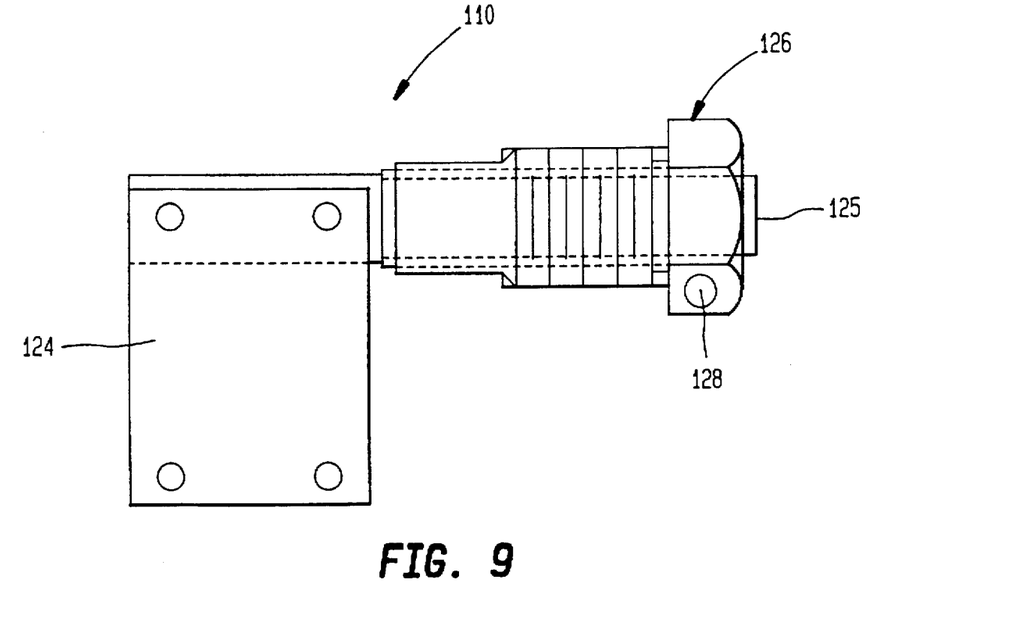
FIG. 9 is a top planar view of the flexure assembly of FIG. 8.

Referring to FIGS. 8 and 9, flexure assembly 110 is disposed about one end of drag link 108 opposite horizontal micrometer adjuster 74 (shown in FIG. 3). A fixed end of the flexure assembly 110 includes a flexure 124 which is attached to a pivot pin 125 that rides inside the bore of a pivot fastener 126. The other end of the flexure assembly 110 is attached to a flexure bracket 130 that is coupled to drag link 108. Pivot fastener 126 is designed to retrofit to a boss 127 of a feeder 131 of the present invention. Such feeder 131 is also available in conventional conveyor systems, such as conveyor system 10 shown in FIG. 1. Typically, boss 127 is a permanent part of the feeder weldment of conventional conveyor systems.

Pivot pin 125 permits angular rotation of flexure 124 which is needed to permit alignment between the machined surfaces 129 to which flexure 124 is attached and alignment of flexure 124 in the direction of the axis of the pivot pin 125. Once the weighing hardware, including weigh assembly 70, is installed and aligned, a set screw 128 is tightened. Since flexure 124 behaves like an unloaded leaf spring, these two adjustments avoid twisting or bending of flexure 124 as a result of installation. Such twisting or bending would preload flexure 124 like a spring and would be sensed by load cell 56. Under normal load cell defection, flexure 124 is subjected to about 35 seconds of arc.

Figure 10:
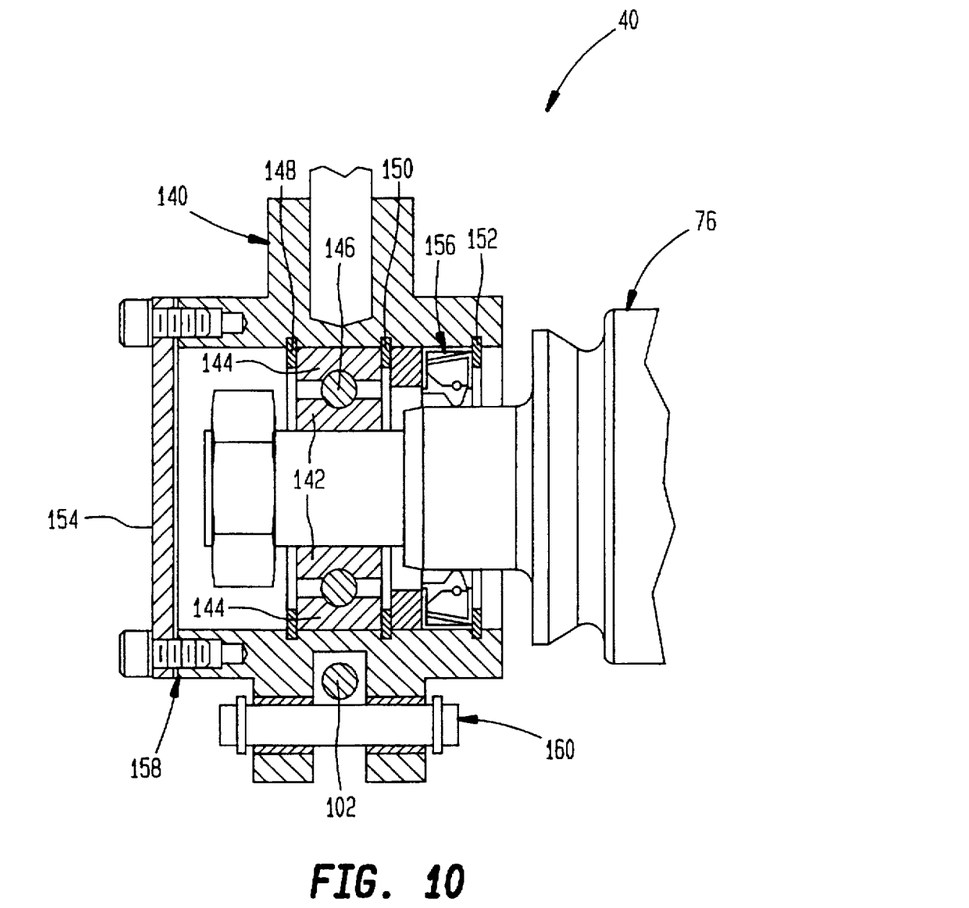
FIG. 10 is an enlarged cross-sectional view of the bearing housing along line 7—7 of FIG. 3.

Referring to FIG. 10, a bearing assembly 40 supports each end of weigh roller 76 for rotation therein. Each bearing assembly 40 includes a bearing housing 140 containing a bearing having an inner race 142 and an outer race 144 capable of sealing therebetween permanently lubricated ball bearings 146. The sides of inner race 142 and outer race 144 are supported within bearing housing 140 by retaining rings (148, 150). Also, an inner retaining ring 152 and an outer cover 154 enclose the open ends of bearing housing 140. Lubricant seal 156 is disposed at the inner surface of inner retaining ring 152, and a gasket 158 is disposed at the inner surface of outer cover 154. Bearing housing 140 also includes a retaining pin 160 for supporting calibration ring 102.

Further deterrents to unwanted changes in system geometry may be accomplished by applying a special alloy construction or a surface treatment, such as a steel alloy or fluorocarbon resin coating (Teflon®), to the outer surface of the rollers, namely weigh roller 76 and support rollers (34, 38), and providing an extra large housing to enclose weigh assembly 70. The surface treatment promotes a nonsticking property for the outer surface of the rollers and preserves the flatness of weigh span 32 (shown in FIG. 1). Without such treatment, foreign matter from the feeder environment, such as floating dust particles from the bulk material, may stick to the outer surface of the rollers and increase the rollers' weight and diameter, thus, affecting their accuracy. By treating the outer surfaces of weigh roller 76 and support rollers (34, 38), such errors are prevented. Also, as shown in FIG. 3, housing 162 encloses the entire weigh assembly 70, except for drag link 108 and flexure assembly 110, to protect the components of weigh assembly 70, described above, from the feeder environment.

The invention having been thus described with particular reference to the preferred forms thereof, it will be obvious that various changes and modifications may be made therein without departing from the spirit and scope of the invention as defined in the appended claims.

What is claimed is:

1. A weigh assembly comprising:
    a weigh roller having first and second ends;
    a first weigh subassembly disposed about said first end of said weigh roller for compensating for variations in the load passing over said weigh roller and being capable of weighing the load passing over said weigh roller, said first weigh subassembly including a first means for controlling the vertical position of said first end of said weigh roller and a first means for controlling the horizontal position of said first end of said weigh roller; and
    a second weigh subassembly disposed about said second end of said weigh roller for compensating for variations in the load passing over said weigh roller and being capable of weighing the load passing over said weigh roller, said second weigh subassembly including a second means for controlling the vertical position of said second end of said weigh roller and a second means for controlling the horizontal position of said second end of said weigh roller.

2. The weigh assembly of claim 1, wherein:
    said first weigh subassembly includes:
        a first spring means for compensating for variations in the load passing over said weigh roller;
        a first point contact pivot assembly disposed between one end of said first spring means and said first means for controlling the vertical position of said first end of said weigh roller;
        a first load cell being connected to the other end of said first spring means which is opposite to said first means for controlling the vertical position of said first end of said weigh roller; and a second point contact pivot affixed to said first load cell opposite said first spring means; and said second weigh subassembly includes:

a second spring means for compensating for variations in the load passing over said weigh roller;

a third point contact pivot assembly disposed between one end of said second spring means and said second means for controlling the vertical position of said second end of said weigh roller;

a second load cell being connected to the other end of said second spring means which is opposite to said second means for controlling the vertical position of said second end of said weigh roller; and a fourth point contact pivot affixed to said second load cell opposite said second spring means.

3. A weigh assembly comprising:

a weigh roller having first and second end;

a first weigh subassembly disposed about said first end of said weigh roller for compensating for variations in the load passing over said weigh roller and being capable of weighing the load passing over said weigh roller, said first weigh subassembly including a first point contact pivot assembly disposed at one end of said first weigh subassembly and a second point contact pivot assembly at another end of said first weigh subassembly opposite said one end of said first weigh subassembly; and a second weigh subassembly disposed about said second end of said weigh roller for compensating for variations in the load passing over said weigh roller and being capable of weighing the load passing over said weigh roller, said second weigh subassembly including a third point contact pivot assembly disposed at one end of said second weigh subassembly and a fourth point contact pivot assembly at another end of said second weigh subassembly opposite said one end of said second weigh subassembly.

4. The weigh assembly of claim 3, further comprising:

said first weigh subassembly including:

a first means for controlling the vertical position of said first end of said weigh roller;

a first means for controlling the horizontal position of said first end of said weigh roller;

a first spring means for compensating for variations in the load passing over said weigh roller; and a first load cell being connected to one end of said first spring means; and said second weigh subassembly comprising:

a second means for controlling the vertical position of said second end of said weigh roller;

a second means for controlling the horizontal position of said second end of said weigh roller;

a second spring means for compensating for variations in the load passing over said weigh roller; and a second load cell being connected to one end of said second spring means.

5. A weigh assembly comprising:

a weigh roller having first and second ends;

a first weigh subassembly disposed about said first end of said weigh roller for compensating for variations in the load passing over said weigh roller and being capable of weighing the load passing over said weigh roller;

a second weigh subassembly disposed about said second end of said weigh roller for compensating for variations in the load passing over said weigh roller and being capable of weighing the load passing over said weigh roller;

a first and second drag link respectively coupled to said first and second weigh subassemblies; and a first and second flexure assemblies disposed about the respective end of said first and second drag links which are opposite said first and second weigh subassemblies, respectively.

6. The weigh assembly of claim 5, wherein:

said first weigh subassembly comprises:

a first means for controlling the vertical position of said first end of said weigh roller;

a first means for controlling the horizontal position of said first end of said weigh roller;

a first spring means for compensating for variations in the load passing over said weigh roller;

a first point contact pivot assembly disposed between one end of said first spring means and said first means for controlling the vertical position of said first end of said weigh roller;

a first load cell capable of weighing the load passing over said weigh roller, said load cell being connected to the other end of said first spring means which is opposite to said first means for controlling the vertical position of said first end of said weigh roller; and a second point contact pivot affixed to said first load cell opposite said first spring means; and said second weigh subassembly comprises:

a second means for controlling the vertical position of said second end of said weigh roller;

a second means for controlling the horizontal position of said second end of said weigh roller;

a second spring means for compensating for variations in the load passing over said weigh roller;

a third point contact pivot assembly disposed between one end of said second spring means and said second means for controlling the vertical position of said second end of said weigh roller;

a second load cell capable of weighing the load passing over said weigh roller, said load cell being connected to the other end of said second spring means which is opposite to said second means for controlling the vertical position of said second end of said weigh roller; and a fourth point contact pivot affixed to said second load cell opposite said second spring means.

7. A weigh assembly comprising:

a weigh roller having first and second ends;

a first means for controlling the vertical position of said first end of said weigh roller;

a first means for controlling the horizontal position of said first end of said weigh roller;

a first spring means for compensating for variations in the load passing over said weigh roller;

a first point contact pivot assembly disposed between one end of said first spring means and said first means for controlling the vertical position of said first end of said weigh roller;

a first load cell capable of weighing the load passing over said weigh roller, said load cell being connected to the other end of said first spring means which is opposite to said first means for controlling the vertical position of said first end of said weigh roller;

a second point contact pivot affixed to said first load cell opposite said first spring means;

a second means for controlling the vertical position of said second end of said weigh roller;

a second means for controlling the horizontal position of said second end of said weigh roller;

a second spring means for compensating for variations in the load passing over said weigh roller;

a third point contact pivot assembly disposed between one end of said second spring means and said second means for controlling the vertical position of said second end of said weigh roller;

a second load cell capable of weighing the load passing over said weigh roller, said load cell being connected to the other end of said second spring means which is opposite to said second means for controlling the vertical position of said second end of said weigh roller; and a fourth point contact pivot affixed to said second load cell opposite said second spring means.

8. The weigh assembly of claim 7, further comprising first and second bearing assemblies each comprising a bearing housing containing a bearing having an inner race and an outer race capable of permanently sealing lubricated ball bearings disposed therebetween, said first and second bearing assemblies being disposed about said first and second end of said weigh roller, respectively.

9. The weigh assembly of claim 8, wherein said first and second bearing assemblies are connected to said first and second means for controlling the vertical position of said weigh roller, respectively, and also being connected to said first and second means for controlling the horizontal position of said weigh roller.

10. The weigh assembly of claim 8, wherein said first and second means for controlling the vertical position of said weigh roller and said first and second means for controlling the horizontal position of said weigh roller are micrometer adjusters comprising a threaded pin having a first pitch of threads on one side of said threaded pin, a second pitch of threads on the other side of said threaded pin that is different from said first pitch of threads, and an adjusting knurl between said first pitch of threads and said second pitch of threads that is capable of rotating said first pitch of threads and second pitch of threads of said threaded pin, thereby allowing for either the vertical or horizontal adjustment of said weigh roller.

11. The weigh assembly of claim 10, further comprising first and second adjuster block and a locking pin for securing said first and second means for controlling the vertical position of said weigh roller at a particular vertical locked position, respectively.

12. The weigh assembly of claim 10, further comprising first and second adjuster block and a locking pin for securing said first and second means for controlling the horizontal position of said weigh roller at a particular horizontal locked position, respectively.

13. The weigh assembly of claim 10, wherein said first pitch of threads and said second pitch of threads of said threaded pin are threaded in a same direction.

14. The weigh assembly of claim 13, wherein said threaded pin is right threaded, and said first pitch of threads is about 16 pitch and said second pitch of threads is about 20 pitch.

15. The weigh assembly of claim 7, further comprising at least one stop pin disposed about one end of each said first and second spring means and adjacent to said respective first and second means for controlling the vertical position of said weigh roller.

16. The weigh assembly of claim 7, wherein said at least one stop pin transfers the weight of the load away from the respective said first and second load cell when the load increases beyond a particular threshold weight.

17. The weigh assembly of claim 16, wherein said particular threshold weight is about 80 lbs.

18. The weigh assembly of claim 7, wherein said first, second, third and fourth point contact pivot assemblies each include a pivot pin having an outer circumferential surface and a pivot ring having an inner circumferential surface wherein a particular high pressure contact point of said inner circumferential surface contacts a respective high pressure contact point of said outer circumferential surface of said pivot pin.

19. The weigh assembly of claim 18, wherein a diameter of said inner circumferential surface of said pivot ring is substantially larger than a diameter of said outer circumferential surface of said pivot pin so that said pivot pin and said pivot ring have a multidegree of freedom of movement relative to each other.

20. The weigh assembly of claim 7, further comprising:

a first and second drag link respectively coupled to said first and second means for controlling the horizontal position of said weigh roller; and a first and second flexure assembly disposed about the respective end of said first and second drag links which are opposite said first and second mean for controlling the horizontal position of said weigh roller, respectively.

21. The weigh assembly of claim 20, wherein said flexure assembly comprises:

a flexure having a first side and a second side;

a pivot pin having a first end portion and a second end portion, said first end portion being attached to said first side of said flexure;

a pivot fastener for receiving said second end portion of said pivot pin, wherein said pivot pin is supported within said pivot fastener for pivotal adjustment therein;

a set screw extending through said pivot fastener and contacting an outer surface of said second end portion of said pivot pin for securing said pivot pin within said pivot fastener; and a flexure bracket attached to said second side of said flexure and coupled to an end of either said first drag link or said second drag link.

22. The weigh assembly of claim 7, wherein an outer surface of said weigh roller includes a surface treatment capable of preventing the adhesion of foreign matters thereto.

23. The weigh assembly of claim 22, wherein said surface treatment is a fluorocarbon resin coating.

24. The weigh assembly of claim 7, wherein each of said first, second, third and fourth point contact type pivot assemblies is either a pin and ring assembly or a hardened chain link assembly.

25. A conveyor system for transporting materials from a feed hopper to an end feed mechanism and for continuously weighing said materials transported by the conveyor system, the conveyor system comprising:

a continuous conveyor belt disposed about a pair of pulleys, said conveyor belt having an upper portion and a lower portion moving in opposite directions;

at least one pair of support rollers positioned under said upper portion and spaced apart to defined boundaries of a weigh span portion of said conveyor belt;

a weigh assembly which comprises: (i) a weigh roller having first and second ends; (ii) a first means for controlling the vertical position of said first end of said weigh roller; (iii) a first means for controlling the horizontal position of said first end of said weigh roller; (iv) a first spring means for compensating for variations in the load passing over said weigh roller; (v) a first point contact pivot assembly disposed between one end of said first spring means and said first means for controlling the vertical position of said first end of said weigh roller; (vi) a first load cell capable of weighing the load passing over said weigh roller, said load cell being connected to the other end of said first spring means which is opposite to said first means for controlling the vertical position of said first end of said weigh roller; (vii) a second point contact pivot affixed to said first load cell opposite said first spring means; (viii) a second means for controlling the vertical position of said second end of said weigh roller; (ix) a second means for controlling the horizontal position of said second end of said weigh roller; (x) a second spring means for compensating for variations in the load passing over said weigh roller; (xi) a third point contact pivot assembly disposed between one end of said second spring means and said second means for controlling the vertical position of said second end of said weigh roller; (xii) a second load cell capable of weighing the load passing over said weigh roller, said load cell being connected to the other end of said second spring means which is opposite to said second means for controlling the vertical position of said second end of said weigh roller; and (xiii) a fourth point contact pivot affixed to said second load cell opposite said second spring means; and said weigh roller being disposed equidistant from each of said support rollers such that said weigh roller and said first and second support rollers are in planar alignment with one another.

26. The conveyor system of claim 25, further comprising first and second bearing assemblies each comprising a bearing housing containing a bearing having an inner race and an outer race capable of permanently sealing lubricated ball bearings disposed therebetween, said first and second bearing assemblies being disposed about said first and second end of said weigh roller, respectively.

27. The conveyor system of claim 26, wherein said first and second bearing assemblies are connected to said first and second means for controlling the vertical position of said weigh roller, respectively, and also being connected to said first and second means for controlling the horizontal position of said weigh roller.

28. The conveyor system of claim 25, wherein said first and second means for controlling the vertical position of said weigh roller and said first and second means for controlling the horizontal position of said weigh roller are micrometer adjusters comprising a threaded pin having a first pitch of threads on one side of said threaded pin, a second pitch of threads on the other side of said threaded pin that is different from said first pitch of threads, and an adjusting knurl between said first pitch of threads and said second pitch of threads that is capable of rotating said first pitch of threads and second pitch of threads of said threaded pin, thereby allowing for either the vertical or horizontal adjustment of said weigh roller.

29. The conveyor system of claim 28, further comprising first and second adjuster block and a locking pin for securing said first and second means for controlling the vertical position of said weigh roller at a particular vertical locked position, respectively.

30. The conveyor system of claim 28, further comprising first and second adjuster block and a locking pin for securing said first and second means for controlling the horizontal position of said weigh roller at a particular horizontal locked position, respectively.

31. The conveyor system of claim 28, wherein said first pitch of threads and said second pitch of threads of said threaded pin are threaded in a same direction.

32. The conveyor system of claim 31, wherein said threaded pin is right threaded, and said first pitch of threads is about 16 pitch and said second pitch of threads is about 20 pitch.

33. The conveyor system of claim 25, further comprising at least one stop pin disposed about one end of each said first and second spring means and adjacent to said respective first and second means for controlling the vertical position of said weigh roller.

34. The conveyor system of claim 25, wherein said at least one stop pin transfers the weight of the load away from the respective said first and second load cell when the load increases beyond a particular threshold weight.

35. The conveyor system of claim 34, wherein said particular threshold weight is about 80 lbs.

36. The conveyor system of claim 35, wherein said first, second, third and fourth point contact type pivot assemblies each include a pivot pin having an outer circumferential surface and a pivot ring having an inner circumferential surface wherein a particular high pressure contact point of said inner circumferential surface contacts a respective high pressure contact point of said outer circumferential surface of said pivot pin.

37. The conveyor system of claim 36, wherein a diameter of said inner circumferential surface of said pivot ring is substantially larger than a diameter of said outer circumferential surface of said pivot pin so that said pivot pin and said pivot ring have a multidegree of freedom of movement relative to each other.

38. The conveyor system of claim 25, further comprising:
a first and second drag link respectively coupled to said first and second means for controlling the horizontal position of said weigh roller; and
a first and second flexure assembly disposed about the respective end of said first and second drag links which are opposite said first and second mean for controlling the horizontal position of said weigh roller, respectively.

39. The conveyor system of claim 38, wherein said flexure assembly comprises:
a flexure having a shaft portion and a plate portion;
a pivot fastener disposed about said shaft portion to support said shaft portion for pivotal adjustment therein;
a set screw extending through an end portion of said pivot fastener for securing said pivot fastener about said shaft portion; and
a flexure bracket coupled to said plate portion of said flexure that is coupled to said end of said first or second drag link.

40. The conveyor system of claim 25, wherein an outer surface of at least one of said weigh roller and said support rollers includes a surface treatment capable of preventing the adhesion of foreign matters thereto.

41. The conveyor system of claim 40, wherein said surface treatment is a fluorocarbon resin coating.

42. The conveyor system of claim 25, wherein each of said first, second, third and fourth point contact pivot assemblies is either a pin and ring assembly or a hardened chain link assembly.

* * * * *